(12) United States Patent
Kikuhara et al.

(10) Patent No.: US 7,875,572 B2
(45) Date of Patent: Jan. 25, 2011

(54) COMBUSTION CATALYST FOR TREATING DIESEL EXHAUST GAS AND METHOD FOR TREATING DIESEL EXHAUST GAS

(75) Inventors: Shunji Kikuhara, Hiratsuka (JP); Takeshi Yamashita, Hiratsuka (JP); Hitoshi Kubo, Hiratsuka (JP); Kazuto Itaya, Hiratsuka (JP); Masahiro Sasaki, Hiratsuka (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 410 days.

(21) Appl. No.: 10/586,548

(22) PCT Filed: Dec. 15, 2005

(86) PCT No.: PCT/JP2005/023025

§ 371 (c)(1),
(2), (4) Date: Jul. 19, 2006

(87) PCT Pub. No.: WO2006/068022

PCT Pub. Date: Jun. 29, 2006

(65) Prior Publication Data

US 2008/0229731 A1    Sep. 25, 2008

(30) Foreign Application Priority Data

Dec. 20, 2004 (JP) ............................. 2004-367724

(51) Int. Cl.
| | |
|---|---|
| B01J 23/54 | (2006.01) |
| B01J 23/63 | (2006.01) |
| B01J 23/10 | (2006.01) |
| B01J 23/38 | (2006.01) |
| B01J 23/48 | (2006.01) |
| F01N 3/10 | (2006.01) |

(52) U.S. Cl. ................. 502/302; 502/303; 502/304; 502/308; 502/326; 502/347; 60/299

(58) Field of Classification Search ......... 502/302–304, 502/308, 326, 347; 60/299
See application file for complete search history.

(56) References Cited

U.S. PATENT DOCUMENTS

| | | | | |
|---|---|---|---|---|
| 4,940,685 | A * | 7/1990 | Sauvion et al. | 502/263 |
| 5,000,929 | A | 3/1991 | Horiuchi et al. | 423/213.5 |
| 5,137,862 | A * | 8/1992 | Mackrodt et al. | 502/303 |
| 5,413,984 | A * | 5/1995 | Marecot et al. | 502/333 |
| 6,107,240 | A * | 8/2000 | Wu et al. | 502/304 |
| 6,455,182 | B1 * | 9/2002 | Silver | 429/17 |

FOREIGN PATENT DOCUMENTS

| | | |
|---|---|---|
| EP | 1399245 A1 | 3/2004 |
| JP | 02-014744 | 1/1990 |
| JP | 10-151348 | 6/1998 |
| JP | 2000-176282 | 6/2000 |
| JP | 2001-104780 | 4/2001 |
| JP | 2001-170483 | 6/2001 |
| JP | 2002-221022 | 8/2002 |
| JP | 2003-135970 * | 5/2003 |
| WO | WO 02/22242 A1 | 3/2002 |
| WO | WO 2004/047985 A1 | 6/2004 |

OTHER PUBLICATIONS

A.D. Logan and M. Shelef, "Oxygen availability in mixed cerium/praseodymium oxides and the effect of noble metals," J. Mater. Res. vol. 9, No. 2, Feb. 1994, pp. 468-475.*
Sumeya Bedrane et al; "Investigation of the Oxygen Storage Process on Ceria and Ceria-zirconia-Supported Catalyst" Catalysis Today; vol. 75, Dec. 31, 2002. pp. 401-405, XP002598548.
Paolo Fornasiero et al.: "Metal Loaded $CEo_2$ -$zRo_2$ Solutions As Innovative Catalysts For Automotivecatalytic Converters" Catalysis Today. vol. 29, Dec. 31, 1996. pages 47-52, XP002598549.
Fernando Marino et al.: "Noble Metal Catalysts for the Preferential Oxidation of Carbon Monoxide in the Presence of Hydrogen (Prox)" Applied Catalysis B:Environmental vol. 54, Jul. 23, 2004, pp. 59-66, XP002598550.
J.M. Gatica et al.: "Characterization of The Metal Phase in $NM/Ce_{0.63} Zr_{0.32} O_2$ (NM:Pt and Pd) Catalysts by Hydrogen Chemisorption and HRTEM Microscopy: A Comparative Study" J. Phys. Chem B, vol. 105, Dec. 31, 2001, pp. 1191-1199, XP002598551.

* cited by examiner

*Primary Examiner*—Timothy C Vanoy
*Assistant Examiner*—Diana J Liao
(74) *Attorney, Agent, or Firm*—Roberts & Roberts, LLP

(57) ABSTRACT

The present invention provides a catalyst for combustion treatment of suspended particulate matter in diesel exhaust gases, and a combustion catalyst for treating diesel exhaust gases in which a precious metal or an oxide thereof as the catalytic component is loaded on a carrier composed of oxide ceramic particles comprising ceria-zirconia or ceria-praseodymium oxide. In the present invention, depending on the carried precious metal, the carrier is preferably composed of oxide ceramic particles further comprising yttria or lanthanum oxide. The present invention provides a sufficient activity to combust suspended particulate matter in exhaust gases, and can cause combustion at a low temperature of about 300° C. It operates stably for a long period, and can burn suspended particulate matter, especially carbon microparticles.

18 Claims, No Drawings

COMBUSTION CATALYST FOR TREATING DIESEL EXHAUST GAS AND METHOD FOR TREATING DIESEL EXHAUST GAS

TECHNICAL FIELD

The present invention relates to a catalyst for treating diesel exhaust gas and a method for treating diesel exhaust gas. It particularly relates to a catalyst which can burn and remove suspended particulate matter, especially carbon microparticles (soot), contained in diesel exhaust gases at a lower temperature than before.

BACKGROUND ART

Exhaust gases emitted from diesel engines contain solid or liquid suspended particulate matter in addition to gaseous materials such as NOx. The suspended particulate matter is mainly composed of solid carbon particles, solid or liquid unburnt-fuel hydrocarbon particles and sulfides including as a major component sulfur dioxide generated by combustion of sulfur in fuels.

Such suspended particulate matter has a problem of being easily taken into human bodies, since it is extremely fine in particle size and liable to suspend in the atmosphere even if it is solid. It has a more serious problem since the level of suspended particulate matter cannot be fully reduced by design changes of engines, though the level of NOx in exhaust gases can be reduced to some degree by design changes of diesel engines.

For solving the problems with the suspended particulate matter, there is no choice but removal from exhaust gases. The method involves collecting the suspended particulate matter by installing a filter in an exhaust system, and burning the collected suspended particulate matter by heating the filter with an electric heater. However, this method necessitates constantly keeping the filter at a high temperature, thereby incurring a power cost increase. Then, for lower power consumption, a means in which a combustion catalyst is carried on the surface of the filter is commonly used.

Although catalysts carrying as a catalytic component a precious metal such as platinum, palladium or rhodium, or an oxide of the precious metal have been used to burn the suspended particulate matter, the effective temperatures (hereinafter, sometimes referred to as combustion temperature) of the precious metal catalysts are high, 500° C. or higher. In such a high temperature region, sulfur dioxide contained in diesel exhaust gases ends up in causing conversion into sulfur trioxide and sulfuric acid mists, thus having a problem of bringing about incomplete cleaning of exhaust gases even when the suspended particulate matter is removed. Thus, it is desired a catalyst exclusively developed for treating diesel exhaust gas.

Here, the present applicant has proposed a catalyst described in Patent Document 1 as a catalyst which has the activity at a low temperature of 500° C. or lower and can burn suspended particulate matter. The catalyst is one which carries an oxide of an alkali metal such as potassium in place of a precious metal as a catalytic component on oxide particles that are a catalyst carrier carrying the catalytic component, whereby the catalyst can burn suspended particulate matter at a low combustion temperature of 350 to 400° C. or so.

Patent Document 1: Japanese Patent Laid-Open No. 2001-170483

DISCLOSURE OF THE INVENTION

Problems to be Solved by the Invention

The above-mentioned conventional catalyst for the treatment of diesel exhaust gas has achieved the initial purpose at the effective temperature and at least accomplished a result. However, taking into consideration applications to actual diesel engines, a lower effective temperature is desirable. This is because although the exhaust gas temperature from diesel engines becomes 350° C. or higher when the engines operate under a high load condition, that scarcely exceeds 300° C. under an ordinary operation condition (for example, when a car equipped with a diesel engine runs in an urban district). Therefore, even if the above-mentioned catalyst is carried, it may possibly be insufficient for cleaning exhaust gases under the ordinary operation condition.

Then, the present invention has an object to provide a catalyst for the treatment of diesel exhaust gas having an effective temperature of, specifically, lower than 350° C., which is a lower temperature than conventional ones.

Means for Solving the Problems

The present inventors have extensively studied to solve the above-mentioned problems, and attempted improvements for both the carrier and the catalytic component, which constitute a catalyst. We have studied applications of complex oxides containing rare earth elements for improving a carrier, found that an oxide ceramic particle containing one of a ceria-zirconia, which is a complex oxide of ceria (cerium oxide: $CeO_2$) and zirconia (zirconium oxide: $ZrO_2$), and a ceria-praseodymium oxide, which is a complex oxide of ceria and praseodymium oxide ($Pr_6O_{11}$ or $Pr_2O_3$), is preferable as the carrier, and achieved the present invention.

That is, the present invention is a combustion catalyst for treating suspended particulate matter in diesel exhaust gases, and a combustion catalyst for treating diesel exhaust gases which is constituted by carrying a precious metal or a precious metal oxide as the catalytic component on a carrier composed of an oxide ceramic particle containing a ceria-zirconia or a ceria-praseodymium oxide.

In the present invention, the ceria in the carrier has some extent of a direct combustion action on suspended particulate matter, but more importantly has an auxiliary function of supplying oxygen for combusting the suspended particulate matter on the catalyst by an oxygen occlusion-release action. The form of the complex oxide of a ceria-zirconia or a ceria-praseodymium oxide is employed because the complex oxide form has more excellent effects on heat resistance and sulfur poisoning resistance than a ceria alone. The action for a catalyst to intrinsically exhibit, which is to combust suspended particulate matter, is borne by the precious metal or precious metal oxide of a catalytic component. Namely, in the catalyst according to the present invention, the oxide ceramic as the carrier containing a ceria-zirconia or a ceria-praseodymium oxide occludes oxygen while releasing oxygen in a diesel exhaust gas atmosphere, while the precious metal or precious metal oxide promotes combustion of suspended particulate matter in reaction to the auxiliary function of the carrier.

The oxide ceramic particle as the carrier has preferably a content of ceria as much as possible, and specifically contains the ceria, preferably, of 45 wt % or more based on the carrier weight. This is because although ceria has an action to supply oxygen to burn suspended particulate matter at a low temperature as described above, and ceria of even less than 50 wt % has a reducing effect of the effective temperature, complete combustion of suspended particulate matter becomes difficult in this case. The more preferable range of the ceria content is 45 to 95 wt %. The remaining of the carrier other than the ceria is preferably zirconia or praseodymium oxide, but may contain an oxide other than that. For example, it may contain alumina, silica or titania. Especially, a carrier further containing after-mentioned yttria or lanthanum oxide exhibits favorable characteristics.

Then, the present inventors have found, as another improvement regarding the carrier, a carrier containing an oxide ceramic particle further containing yttria (yttrium oxide: $Y_2O_3$) or lanthanum oxide ($La_2O_3$) in addition to the above-mentioned ceria-zirconia or ceria-praseodymium oxide. This carrier also has an auxiliary function of the oxygen storage-release action, and is improved in heat resistance and sulfur poisoning resistance. Containing yttria or lanthanum oxide results in a further improvement in the catalyst heat resistance.

This carrier also has preferably a ceria content as much as possible. Specifically, the carrier is preferably composed of ceria of 45 to 95 wt % and yttria or lanthanum oxide of 0.1 to 15 wt %. A carrier consisting of a ceria-zirconia-yttria or ceria-zirconia-lanthanum oxide complex oxide is most preferable, where the remainder other than ceria, and yttria or lanthanum oxide is occupied only by zirconia. Here, an oxide other than those oxides may be contained. For example, alumina, silica or titania may be contained.

With the improvement of the carrier described above, a catalytic component carried on the carrier is preferably a precious metal, and preferably ruthenium, iridium, platinum and silver. An especially preferable precious metal component is ruthenium and iridium as major components. With ruthenium being employed as a catalytic component, a carrier of a ceria-zirconia or ceria-praseodymium oxide is most excellent in activity. With iridium being employed as a catalytic component, a carrier further containing yttria or lanthanum oxide (ceria-zirconia-yttria or ceria-praseodymium oxide-lanthanum oxide) is preferably suitable. Further, also for platinum or silver, a ceria-zirconia-yttria or ceria-praseodymium oxide-lanthanum oxide is preferable as a carrier. The catalytic component may be a precious metal in a metal state or its oxide wholly or partly.

The loading of a precious metal (ruthenium, iridium, platinum or silver) is preferably in a suitable range to fully satisfy the purpose of the low temperature combustion. Specifically, the loading of a catalytic component is preferably 0.1 to 10 wt % to a carrier weight. The lower limit of 0.1 wt % is a minimum loading for holding the activity. By contrast, a loading above the upper limit of 10 wt % would not provide a higher activity (a lower effective temperature). The especially preferable loading is 0.1 to 5 wt %.

In the catalyst according to the present invention, a catalyst carrying ruthenium or iridium (hereinafter, sometimes referred to simply as ruthenium catalyst or iridium catalyst) is, in comparison to one in which such precious metal alone is carried, preferably one in which another precious metal is further additionally carried. Because this can shift the development of the catalyst activity to a lower temperature, and the combustion temperature can be lowered.

As the kind of the additional catalytic component, iridium and/or silver are suitably used for the ruthenium catalyst. In this case, iridium is preferably loaded so that the ratio of the loading of ruthenium to that of iridium (ruthenium:iridium) is 1:20 to 20:1 (more preferably 1:20 to 3:1). For silver, the ratio in loading of both the metals (ruthenium:silver) is preferably 1:10 to 10:1 (more preferably 1:3 to 3:1). With the loading of iridium or silver of less than the above-mentioned ratio, the effect is not exhibited. By contrast, with too much the loading, the catalyst properties of ruthenium, which is the major catalytic component, is diluted. Iridium exhibits the effect in a small amount addition in comparison to silver.

On the other hand, a preferable additional catalytic component for the iridium catalyst is at least one of platinum, rhodium, ruthenium, palladium and silver. Among these additional precious metals, especially preferable precious metals are platinum, rhodium and ruthenium. In this case, the loading of platinum is preferably such that the ratio of the loading of iridium and that of platinum (iridium:platinum) is 1:30 to 30:1 (more preferably 1:3 to 3:1). The loading of rhodium is preferably such that the ratio of the loading of iridium and that of rhodium (iridium:rhodium) is 1:30 to 30:1 (more preferably 1:3 to 3:1). Further, the loading of ruthenium is preferably such that the ratio of the loading of iridium and that of ruthenium (iridium:ruthenium) is 1:20 to 20:1 (more preferably 1:3 to 10:1). Like the above described, this is for exhibiting the effect of carrying the additional precious metal and for not deteriorating the properties of iridium, which is the major component. The additional metal may be carried in plural kinds; for example, two kinds of precious metals of ruthenium and silver may additionally be carried for iridium.

A combustion catalyst according to the present invention can be prepared by a simple method. Basically, with an aqueous solution containing metal species such as a metal powder, precious metal oxide powder, colloidal particle, alkoxide, metal salt (nitrate, carbonate, sulfate, acetate, etc.) and hydroxide, of a precious metal to become a catalytic component, an oxide ceramic powder to become a carrier is impregnated to adhere the metal species on the surface of the ceramic powder; thereafter the resultant is dried, and further heat-treated to obtain a catalyst carrying the catalytic component. This is a production method of catalysts similar to common methods.

With respect to carrying of an additional catalytic component, the aqueous solution for making a carrier carry a precious metal to become the major component may be a mixed aqueous solution containing an additional metal species. A catalyst carrying a precious metal to become the major component may first be prepared and then impregnated with an aqueous solution containing a metal species of an additional catalytic component; the reverse may be allowed. As an aqueous solution for separately carrying an additional metal, an aqueous solution containing metal species such as a metal powder, oxide powder, colloidal particle, alkoxide, metal salt (nitrate, carbonate, sulfate, acetate, etc.) and hydroxide, of the precious metal, is applicable like the above described.

The catalyst according to the present invention is in actual use preferably supported on a suitable base material (a ceramic honeycomb such as alumina, zirconia, titania, silica or zeolite one, or a metal base material such as a metal honeycomb). Here, a catalytic powder is made into a slurry, in which a base material is immersed to form a catalyst layer on the base material surface. Meanwhile, a catalyst according to the present invention can be used in a powdery state as it is. In this case, a catalyst in a powdery state is filled in a container, and utilized by passing an exhaust gas through the container.

When a metal base material is used, a catalyst layer is preferably formed on a base material by the so-called wash coating. In the wash coating, a base material is immersed in a slurry of an oxide ceramic containing ceria (zirconia, praseodymium oxide, yttria or lanthanum oxide) becoming a carrier to form a ceramic layer (wash coat) on the surface thereof, immersed in an aqueous solution containing a metal species to adhere the metal species on the ceramic layer, and thereafter heat-treated to form a catalyst layer. The thickness of the wash coating in this case is preferably 5 to 50 µm.

In the present invention, a catalyst layer composed only of an oxide ceramic containing ceria (zirconia, praseodymium oxide, yttria or lanthanum oxide) may be formed on a base material by wash coating. Meanwhile, an oxide such as alumina, zirconia, titania, silica or zeolite, which is conventionally used in the wash coating, is formed as the underlying layer, and an oxide ceramic layer according to the present invention is formed thereon to form a double oxide layer, on which a catalyst metal may be carried.

The form of a base material is not limited to a honeycomb shape described above, and may be particulate and sheet-like. It may also be a filter of fiber or of metal gauze or the like and various PM filters for diesel exhaust gases.

Effect of the Invention

As explained above, the combustion catalyst for the treatment of diesel exhaust gas according to the present invention has a sufficient activity on combustion of suspended particulate matter in gases, and can produce combustion at a low temperature of about 300° C. The catalyst according to the present invention acts stably in a long period, and can burn suspended particulate matter, especially carbon microparticles.

A method for treating diesel exhaust gases using the catalyst according to the present invention involves steps of collecting suspended particulate matter in diesel exhaust gases, and burning/eliminating the collected suspended particulate matter by the catalyst according to the present invention. Here, prior to and posterior to the treatment step by the catalyst according to the present invention, other exhaust gas treatments may be performed. For example, prior to the treatment step by the catalyst of the present invention, a step of reducing $NO_2$ in exhaust gases into $N_2$ may be performed. This more enhances the effect of the low-temperature combustion by the catalyst of the present invention. However, $NO_2$ can also be rendered to be an oxygen source to burn suspended particulate matter; the presence of $NO_2$ in exhaust gases can even increase the combustion rate; therefore the reduction treatment of $NO_2$ in a prior stage is not always essential.

BEST MODE FOR CARRYING OUT THE INVENTION

Hereinafter, preferred embodiments of the present invention will be described.

EXAMPLE 1

A ceria-zirconia powder of 1 g was impregnated with 0.67 g of a 4.5% ruthenium nitrate solution, dried, and thereafter calcined at 500° C. for 0.5 h to obtain a catalyst (ruthenium catalyst) carrying ruthenium on the ceria-zirconia carrier. The ruthenium loading of the catalyst was 3 wt %.

COMPARATIVE EXAMPLE 1

For confirming the low-temperature combustion of the catalyst relevant to Example 1, as a comparative example, a combustion catalyst in which alumina particles being a carrier carry platinum particles as the catalyst particle was prepared. 0.59 g of a dinitrodiammine platinum solution of 8.476 wt % in platinum concentration was dropped to an alumina powder of 1.0 g, and thereafter heat-treated as in Example 1 to prepare a catalyst (the platinum loading was 5 wt %).

Combustion Test

Mixed powders (carbon micropowder content: 5 wt %) obtained by mixing combustion catalysts relevant to Example 1 and Comparative Example 1 with a carbon micropowder were heated to burn the carbon micropowder for the combustion performance test. The test of the combustion performance was conducted by the TG-DTA method (thermogravimetric-differential thermal analysis). In the test, with the final heating temperature set at 600° C., the mass change of the mixed powder from the heating start to a prescribed time after reaching 600° C. was tracked, and the generated heat quantity was measured. With respect to the determination of the combustion temperature, a temperature for combustion initiation was assumed a temperature at which a clear mass decrease and heat generation were initiated in the obtained TG-DTA curve. Table 1 shows the temperature for combustion initiation of each catalyst.

TABLE 1

| Sample | Temperature for combustion initiation |
|---|---|
| Example 1 (3% Ru/$CeO_2$—$ZrO_2$) | 323.5° C. |
| Comparative Example 1 (5% Pt/$Al_2O_3$) | 580.2° C. |

As known from Table 1, the catalyst relevant to Example 1 has a temperature for combustion initiation of 323.5° C., which fully satisfies the target of lower than 350° C. By contrast, in Comparative Example 1, although the combustion of the carbon powder is produced, the combustion temperature exceeded 500° C. Accordingly, the catalyst relevant to this example is confirmed to be excellent in lowering the combustion temperature.

EXAMPLE 2 AND EXAMPLE 3

Catalysts carrying iridium and silver in addition to ruthenium as the catalyst metal in Example 1 was prepared, and the combustion temperatures thereof were studied. The ruthenium catalyst (ruthenium 3 wt %) of 2 g prepared in Example 1 was impregnated with 2 g of an iridium chloride solution of 1.0 wt % in iridium concentration to obtain a ruthenium-iridium catalyst (Example 2). Then, the ruthenium-iridium catalyst of 1 g of Example 2 was impregnated with 1 g of a silver nitrate solution of 3.0 wt % in silver concentration to obtain a ruthenium-iridium-silver catalyst (Example 3).

With respect to these catalysts as well, as in Example 1, mixed powders (carbon micropowder content: 5 wt %) obtained by mixing the catalysts with a carbon micropowder were heated to burn the carbon micropowder for the combustion performance test by the TG-DTA. Here in addition to the initial activity (the temperature for combustion initiation immediately after the preparation) as in Example 1, the temperature for combustion initiation of the catalyst heated at 650° for a prescribed time was examined, and their heat resistance was also studied. Table 2 shows the result.

TABLE 2

| Sample | Initial activity (immediately after preparation) | After heating (heating temperature × heating time) | |
|---|---|---|---|
| | | 650° C. × 24 hours | 650° C. × 48 hours |
| Example 2 (3% Ru-1% Ir/ $CeO_2$—$ZrO_2$) | 309° C. | 310° C. | 312° C. |
| Example 3 (3% Ru-1% Ir-3% Ag/$CeO_2$—$ZrO_2$) | 302° C. | 298° C. | 303° C. |

From the result shown in Table 2, the catalysts in which iridium and silver are subsidiarily carried on the catalyst relevant to Example 1 are confirmed to decrease in the temperature for combustion initiation (initial activity) by 10 to 20° C. and to more improve in its characteristics. The catalysts are confirmed to be good in heat resistance, to exhibit a low-temperature activity also after heated at 650° C., and to maintain it even if the heating temperature is given for a long time.

EXAMPLE 4

A catalyst was prepared by using as the carrier an oxide ceramic containing yttria in addition to a ceria-zirconia and by carrying iridium thereon as the catalyst metal. A ceria-zirconia-yttria powder (average particle size of about 5 μm) of 1 g was impregnated with 2 g of an iridium chloride solution having an iridium content of 1.0%, dried, and calcined at 500° C. for 2 hours. Thereafter, it was made clean of chlorine and impurities, filtrated, and dried at 120° C. for one night to obtain a catalyst. The iridium loading of the catalyst was 2 wt %.

EXAMPLE 5

A catalyst was prepared by using as the carrier a ceria-zirconia-yttria and by carrying platinum thereon as the catalyst metal. A ceria-zirconia-yttria powder (average particle size of about 5 μm) of 1 g was impregnated with 0.094 g of a dinitrodiammine platinum solution of 8.476 wt % in platinum concentration, dried, and calcined at 500° C. for 2 hours. Thereafter, it was made clean of chlorine and impurities, filtrated, and dried at 120° C. for one night to obtain a catalyst. The platinum loading of the catalyst was 0.8 Wt %.

With respect to the catalysts prepared in Example 4 and Example 5, mixed powders (carbon micropowder content: 5 wt %) obtained by mixing the catalysts with a carbon micropowder were, as in Example 1, heated to burn the carbon micropowder for the combustion performance test by the TG-DTA. Table 3 shows the result.

TABLE 3

| Sample | Temperature for combustion initiation |
|---|---|
| Example 4 (2% Ir/$CeO_2$—$ZrO_2$—$Y_2O_3$) | 301.0° C. |
| Example 5 (0.8% Pt/$CeO_2$—$ZrO_2$—$Y_2O_3$) | 325.0° C. |
| Comparative Example 1 (5% Pt/$Al_2O_3$) | 580.2° C. |

From Table 3, the catalysts relevant to Example 4 and Example 5 which have a ceria-zirconia-yttria as the carrier are confirmed to have a lower temperature for combustion initiation.

EXAMPLE 6

Then, by making an adjustment with respect to the iridium loading by adjusting the use amount of the iridium chloride solution according to the production steps of Example 4, iridium catalysts were prepared whose iridium loadings were 0.5 wt %, 1 wt %, 2 wt %, 3 wt %, 5 wt % 10 wt % and 20 wt %. These catalysts were similarly tested for the combustion, and studied for their performances. Table 4 shows the results.

TABLE 4

| | Ir loading (carrier: $CeO_2$—$ZrO_2$—$Y_2O_3$) | | | | | | |
|---|---|---|---|---|---|---|---|
| | 0.5 wt % | 1.0 wt % | 2.0 wt % | 3.0 wt % | 5.0 wt % | 10 wt % | 20 wt % |
| Temperature for combustion initiation | 299° C. | 301° C. | 301° C. | 297° C. | 302° C. | 303° C. | 310° C. |

As known from Table 4, the effect of lowering of the effective temperature is exhibited even with the iridium loading varied. The loading of 10 wt % or less provides the especially favorable result.

EXAMPLE 7

A catalyst was prepared by using a ceria-zirconia-yttria as the carrier and by carrying thereon iridium as the catalyst metal and further silver as an additional precious metal. A ceria-zirconia-yttria powder (average particle size of about 5 μm) of 1 g was impregnated with 1 g of an iridium chloride solution having an iridium content of 1.0%, dried, and calcined at 500° C. for 2 hours. Thereafter, it was cleaned of chlorine and impurities, filtrated, and dried at 120° C. for one night to obtain an iridium catalyst. Then, the iridium catalyst of 1 g was impregnated with 1 g of a silver nitrate solution of 3.0 wt % in silver concentration to obtain an iridium-silver catalyst (iridium loading: 1 wt %, silver loading: 3 wt %).

EXAMPLE 8

A catalyst was prepared, as in Example 7, by using a ceria-zirconia-yttria as the carrier and by carrying thereon iridium as the catalyst metal and further rhodium as an additional precious metal. The iridium catalyst (iridium loading: 1 wt %), prepared by the steps as in Example 7, of 1 g was impregnated with 0.67 g of a rhodium nitrate solution of 3.0 wt % in rhodium concentration to obtain an iridium-rhodium catalyst (iridium loading: 1 wt %, rhodium loading: 0.2 wt %).

EXAMPLE 9

A catalyst was prepared by using a ceria-zirconia-yttria as the carrier and by carrying thereon iridium as the catalyst metal and further platinum as an additional precious metal. The iridium catalyst (iridium loading: 1 wt %), prepared by the steps as in Example 7, of 1 g was impregnated with 0.059 g of a dinitrodiammine platinum solution of 8.476 wt % in platinum concentration to obtain an iridium-platinum catalyst (iridium loading: 1 wt %, platinum loading: 0.5 wt %).

EXAMPLE 10

A catalyst was prepared by using a ceria-zirconia-yttria as the carrier and by carrying thereon iridium as the catalyst metal and further ruthenium as an additional precious metal. The iridium catalyst (iridium loading: 1 wt %), prepared by the steps as in Example 7, of 1 g was impregnated with 0.022 g of a solution of 4.5% ruthenium nitrate to obtain an iridium-ruthenium catalyst (iridium loading: 1 wt %, ruthenium loading: 0.1 wt %).

With respect to the catalysts of Example 7 to Example 10 prepared as above, mixed powders (carbon micropowder content: 5 wt %) obtained by mixing the catalysts with a carbon micropowder were heated, as in Example 1, to burn the carbon micropowder for the combustion performance test by the TG-DTA. Table 5 shows the result.

TABLE 5

| Sample | Temperature for combustion initiation |
|---|---|
| Example 7 (1% Ir-3% Ag/$CeO_2$—$ZrO_2$—$Y_2O_3$) | 295.0° C. |
| Example 8 (1% Ir-0.2% Rh/$CeO_2$—$ZrO_2$—$Y_2O_3$) | 296.0° C. |
| Example 9 (1% Ir-0.5% Pt/$CeO_2$—$ZrO_2$—$Y_2O_3$) | 290.0° C. |
| Example 10 (1% Ir-0.1% Ru/$CeO_2$—$ZrO_2$—$Y_2O_3$) | 298.0° C. |
| Comparative Example 1 (5% Pt/$Al_2O_3$) | 580.2° C. |

As known from Table 5, any of the catalysts in Example 7 to Example 10 in which iridium, and silver, rhodium, platinum or ruthenium as the additional precious metal are carried on the ceria-zirconia-yttria carrier is confirmed to have a temperature for combustion initiation of lower than 300° C., exhibiting the favorable characteristic.

EXAMPLE 11

A catalyst was prepared by using a ceria-praseodymium oxide-lanthanum oxide as the carrier and by carrying platinum thereon as the catalyst metal. A ceria-praseodymium oxide-lanthanum oxide powder (average particle size of about 5 µm) of 1 g was impregnated with 0.094 g of a dinitrodiammine platinum solution of 8.476 wt % in platinum concentration, dried, and thereafter calcined at 500° C. for 2 hours. Thereafter, it was made clean of chlorine and impurities, filtrated, and dried at 120° C. for one night to obtain a catalyst. The platinum loading of the catalyst was 0.8 wt %.

With respect to the prepared catalysts, as in Example 1, mixed powders (carbon micropowder content: 5 wt %) obtained by mixing the catalysts with a carbon micropowder were heated to burn the carbon micropowder for the combustion performance test by the TG-DTA. Table 6 shows the result.

TABLE 6

| Sample | Temperature for combustion initiation |
|---|---|
| Example 11 (0.8% Pt/$CeO_2$—$Pr_6O_{11}$—$La_2O_3$) | 320.0° C. |
| Comparative Example 1 (5% Pt/$Al_2O_3$) | 580.2° C. |

As known from Table 6, the catalyst using a ceria-praseodymium oxide-lanthanum oxide as the carrier also has a temperature for combustion initiation of lower than 350° C. It is confirmed to have this clear effect of lowering of the combustion temperature in comparison to Comparative Example using platinum, which is the same as in this Example, as the catalyst metal.

EXAMPLE 12

Next, a catalyst was prepared by using a ceria-praseodymium oxide-lanthanum oxide as the carrier and by carrying iridium thereon as the catalyst metal. A ceria-praseodymium oxide-lanthanum oxide powder of 1 g was impregnated with an iridium chloride solution having an iridium content of 1.0%, dried, and thereafter calcined at 500° C. for 2 hours. Thereafter, it was made clean of chlorine and impurities, filtrated, and dried at 120° C. for one night to obtain a catalyst. Here, by making an adjustment with respect to the iridium loading by adjusting the use amount of iridium chloride, the catalysts having iridium loadings of 0.5 wt %, 1 wt %, 3 wt %, 10 wt % and 20 wt % were prepared.

Then, with respect to the prepared catalysts, as in Example 1, mixed powders (carbon micropowder content: 5 wt %) obtained by mixing the catalysts with a carbon micropowder were heated to burn the carbon micropowder for the combustion performance test by the TG-DTA. Table 7 shows the result.

TABLE 7

| | Ir loading (carrier: $CeO_2$—$Pr_6O_{11}$—$La_2O_3$) | | | | |
|---|---|---|---|---|---|
| | 0.5 wt % | 1.0 wt % | 3.0 wt % | 10 wt % | 20 wt % |
| Temperature for combustion initiation | 287° C. | 288° C. | 288° C. | 290° C. | 311° C. |

As known from Table 7, in the catalysts having a ceria-praseodymium oxide-lanthanum oxide as the carrier, using iridium as the catalyst metal can reduce the temperature for combustion initiation. In this case, the catalyst having an iridium loading of 10 wt % or less provides an especially preferable result because it can make the temperature for combustion initiation lower than 300° C.

EXAMPLE 13

A catalyst was prepared by using a ceria-zirconia-praseodymium oxide as the carrier and by carrying thereon iridium as the catalyst metal and further silver as an additional precious metal. A ceria-zirconia-praseodymium oxide powder (average particle size of about 5 µm) of 1 g was impregnated with 1 g of an iridium chloride solution having an iridium content of 1.0%, dried, and calcined at 500° C. for 2 hours. Thereafter, it was cleaned of chlorine and impurities, filtrated, and dried at 120° C. for one night to obtain an iridium catalyst. Then, the iridium catalyst of 1 g was impregnated with 1 g of a silver nitrate solution of 3.0 wt % in silver concentration to obtain an iridium-silver catalyst (iridium loading: 1 wt %, silver loading: 3 wt %).

EXAMPLE 14

As in Example 13, a catalyst was prepared by using a ceria-zirconia-praseodymium oxide as the carrier and by carrying thereon iridium as the catalyst metal and further rhodium as an additional precious metal. The iridium catalyst (iridium loading: 1 Wt %), prepared by the steps as in Example 7, of 1 g was impregnated with 0.067 g of a rhodium nitrate solution of 3.0 wt % in rhodium concentration to obtain an iridium-rhodium catalyst (iridium loading: 1 wt %, rhodium loading: 0.2 wt %).

EXAMPLE 15

A catalyst was prepared by using a ceria-zirconia-praseodymium oxide as the carrier and by carrying thereon iridium as the catalyst metal and further platinum as an additional precious metal. The iridium catalyst (iridium loading: 1 Wt %), prepared by the steps as in Example 13, of 1 g was impregnated with 0.059 g of a dinitrodiammine platinum solution of 8.476 wt % in platinum concentration to obtain an iridium-platinum catalyst (iridium loading: 1 wt %, platinum loading: 0.5 wt %).

EXAMPLE 16

A catalyst was prepared by using a ceria-zirconia-praseodymium oxide as the carrier and by carrying thereon iridium as the catalyst metal and further ruthenium as an additional precious metal. The iridium catalyst (iridium loading: 1 wt %), prepared by the steps as in Example 13, of 1 g was impregnated with 0.022 g of a solution of 4.5% ruthenium nitrate to obtain an iridium-ruthenium catalyst (iridium loading: 1 wt %, ruthenium loading: 0.1 wt %).

With respect to the catalysts of Example 12 to Example 15 prepared as above, mixed powders (carbon micropowder content: 5 wt %) obtained by mixing the catalysts with a carbon micropowder were heated, as in Example 1, to burn the carbon micropowder for the combustion performance test by the TG-DTA. Table 8 shows the result.

TABLE 8

| Sample | Temperature for combustion initiation |
|---|---|
| Example 13 (1% Ir-3% Ag/$CeO_2$—$Pr_6O_{11}$—$La_2O_3$) | 280.0° C. |
| Example 14 (1% Ir-0.2% Rh/$CeO_2$—$Pr_6O_{11}$—$La_2O_3$) | 286.0° C. |
| Example 15 (1% Ir-0.5% Pt/$CeO_2$-$r_6O_{11}$—$La_2O_3$) | 285.0° C. |
| Example 16 (1% Ir-0.1% Ru/$CeO_2$—$Pr_6O_{11}$—$La_2O_3$) | 285.0° C. |
| Comparative Example 1 (5% Pt/$Al_2O_3$) | 580.2° C. |

As known from Table 8, any of the catalysts in Example 13 to Example 16 in which iridium, and silver, rhodium, platinum or ruthenium as the additional precious metal are carried on the ceria-zirconia-praseodymium oxide carrier is confirmed to have a temperature for combustion initiation of lower than 300° C., exhibiting the favorable characteristic.

The invention claimed is:

1. A combustion catalyst for treating a suspended particulate matter in a diesel exhaust gas, wherein said combustion catalyst comprises: a carrier consisting of a ceria-praseodymium oxide-lanthanum oxide; and a precious metal or an oxide thereof as a catalytic component loaded on the carrier.

2. The combustion catalyst for treating a diesel exhaust gas according to claim 1, wherein the carrier has a ceria content of 45 to 95 wt %.

3. The combustion catalyst for treating a diesel exhaust gas according to claim 1, wherein the carrier has a coria content of 45 to 95 wt %, and a content of lanthanum oxide of 0.1 to 15 wt %.

4. The combustion catalyst for treating a diesel exhaust gas according to claim 1, wherein the precious metal as the catalytic component comprises ruthenium.

5. The combustion catalyst for treating a diesel exhaust gas according to claim 4, wherein the carrier has a loading of ruthenium of 0.1 to 10 wt % based on the carrier weight.

6. The combustion catalyst for treating a diesel exhaust gas according to claim 1, wherein the precious metal as the catalytic component comprises iridium.

7. The combustion catalyst for treating a diesel exhaust gas according to claim 6, wherein the carrier has a loading of iridium of 0.1 to 10 wt % in terms of the carrier weight.

8. The combustion catalyst for treating a diesel exhaust gas according to claim 1, wherein the precious metal as the catalytic component comprises platinum or silver.

9. The combustion catalyst for treating a diesel exhaust gas according to claim 8, wherein the carrier has a loading of platinum or silver of 0.1 to 10 wt % in terms of the carrier weight.

10. The combustion catalyst for treating a diesel exhaust gas according to claim 4, wherein the catalytic component further comprises iridium and/or silver.

11. The combustion catalyst for treating a diesel exhaust gas according to claim 10 which comprises iridium and, wherein a loading ratio of ruthenium to iridium (ruthenium: iridium) is 1:20 to 20:1.

12. The combustion catalyst for treating a diesel exhaust gas according to claim 10 which comprises silver and, wherein a loading ratio of ruthenium to silver (ruthenium: silver) is 1:10 to 10:1.

13. The combustion catalyst for treating a diesel exhaust gas according to claim 6, wherein the catalytic component further comprises at least one of platinum, rhodium, ruthenium, palladium and silver.

14. The combustion catalyst for treating a diesel exhaust gas according to claim 13 which comprises platinum and, wherein a loading ratio of iridium to platinum (iridium:platinum) is 1:30 to 30:1.

15. The combustion catalyst for treating a diesel exhaust gas according to claim 10 which comprises rhodium and, wherein a loading ratio of iridium to rhodium (iridium: rhodium) is 1:30 to 30:1.

16. The combustion catalyst for treating a diesel exhaust gas according to claim 1, wherein the carrier is formed on a surface of a metal base via wash coating.

17. A method for combustion treatment of a diesel exhaust gas, comprising the steps of: collecting a suspended particulate matter in a diesel exhaust gas, and burning or eliminating the collected suspended particulate matter by the catalyst according to claim 1.

18. The combustion catalyst for treating a diesel exhaust gas according to claim 1, wherein the carrier has a content of lanthanum oxide of 0.1 to 15 wt %.

* * * * *